United States Patent [19]
Linke et al.

[11] Patent Number: 5,470,361
[45] Date of Patent: Nov. 28, 1995

[54] PROCESS FOR WORKING UP MUNICIPAL PLASTIC WASTE MATERIALS BY GASIFICATION

[75] Inventors: Adolf Linke; Werner Pohl; Karl Schmid, all of Essen; Rolf Wetzel, Heiligenhaus, all of Germany

[73] Assignee: Krupp Koppers GmbH, Essen, Germany

[21] Appl. No.: 331,364

[22] Filed: Oct. 27, 1994

[30] Foreign Application Priority Data

Oct. 27, 1993 [DE] Germany .................. 43 36 580.9

[51] Int. Cl.[6] ................ C10J 3/06; C10K 1/02; C10K 1/06
[52] U.S. Cl. .............. 48/197 R; 48/209; 252/373; 423/240 R; 423/418.2
[58] Field of Search ................. 48/197 R, 206, 48/209, 203; 252/373; 423/240 R, 418.2, 481; 585/240, 241; 588/205, 213, 220, 226, 216; 60/39.02

[56] References Cited

U.S. PATENT DOCUMENTS

| | | | |
|---|---|---|---|
| 3,671,209 | 6/1972 | Teichmann et al. | 48/207 |
| 3,843,339 | 10/1974 | Saito | 48/209 |
| 3,956,414 | 5/1976 | Oshima | 585/241 |
| 4,468,376 | 8/1984 | Suggilt | 423/240 R |
| 4,833,877 | 5/1989 | Ahland et al. | 60/39.02 |
| 4,969,931 | 11/1990 | Wu et al. | 252/373 |
| 4,978,369 | 12/1990 | Pontow et al. | 48/197 R |
| 5,369,947 | 12/1994 | Dummersdorf et al. | 60/39.02 |

FOREIGN PATENT DOCUMENTS 3832804  3/1990  Germany .................. 423/240 R

*Primary Examiner*—Peter Kratz
*Attorney, Agent, or Firm*—Michael J. Striker

[57] ABSTRACT

In the process for gasification of municipal waste plastic waste material pieces of about a 20 mm piece size are compressed and heated at a pressure of from 40 to 80 bar until at a temperature of from 230° to 300° C. to produce an HCl-containing gas and a plastic waste material containing less than 3000 mg of HCl per kg and the HCl-containing gas produced is washed with water to produce a hydrochloric acid solution. The plastic waste material is then heated further until at a temperature of from 400° to 500° C. to form a plastic melt having a viscosity of less than 300 cSt, advantageously less than 50 cSt. This plastic melt is gasified at a pressure of 4 bar with oxygen in a flame reaction to form a crude gas containing a preponderant proportion of CO in relation to $CO_2$ in a gasification chamber having a central temperature of about 1600° C. The crude gas is withdrawn from the gasification reactor at a temperature of 1300° to 1600° C., quenched with a water spray to cool it until at a temperature of 700° to 900° C. and then further cooled by indirect heat transfer in a heat exchanger producing steam until at a temperature of from 220° to 300° C. The cooled crude gas is dedusted until a dust content of less than 20 $mg/Nm^3$ of crude gas is reached and the dedusted gas is washed and desulfurized to form the product gas.

11 Claims, 1 Drawing Sheet

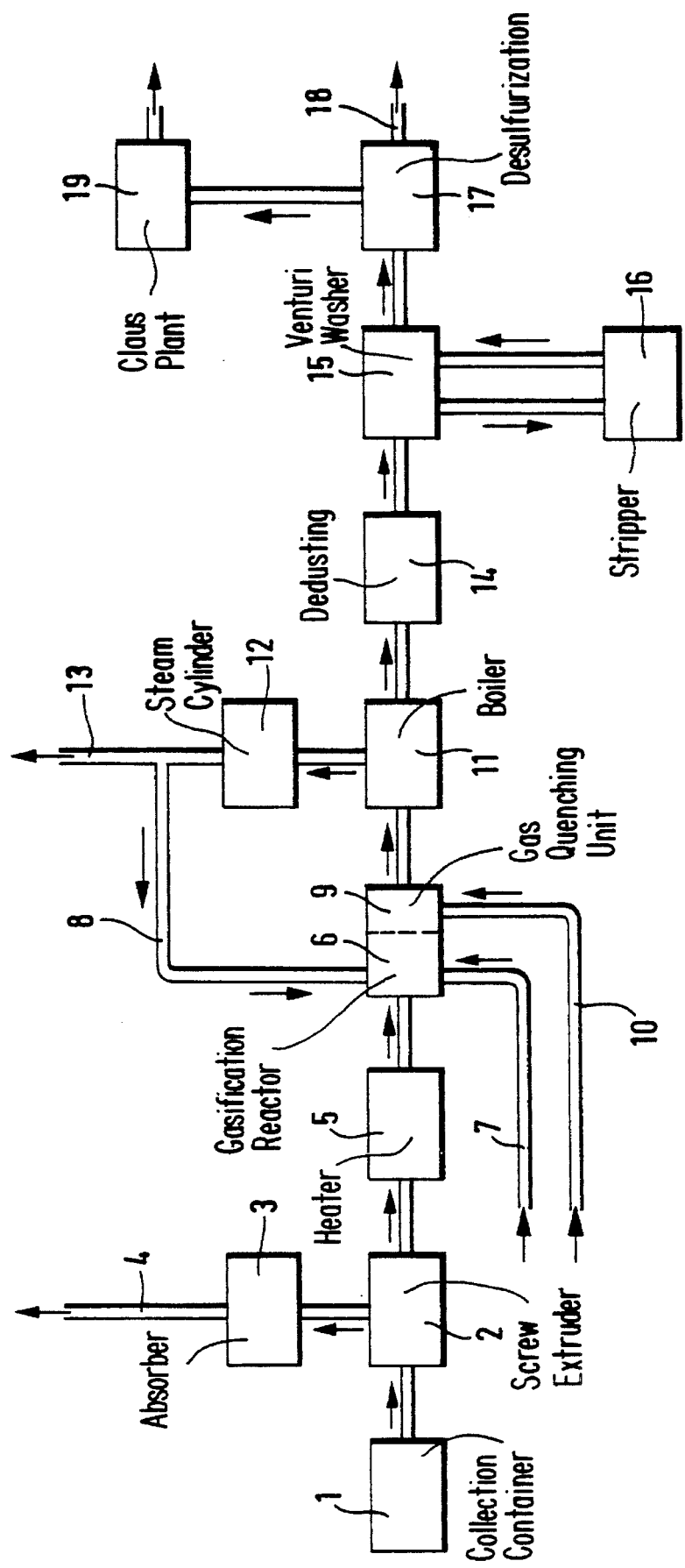

PROCESS FOR WORKING UP MUNICIPAL PLASTIC WASTE MATERIALS BY GASIFICATION

BACKGROUND OF THE INVENTION

The present invention relates to a process for working up municipal plastic waste materials by gasification.

About 3.5 million tons of plastic are produced in Germany, of which a predominant portion is used for packaging and, after use, is disposed in garbage. Prior to the introduction of the so-called dual system it was common that this plastic waste together with the standard municipal garbage was either deposited in a dump or was burned in a garbage incineration plant. With the introduction of the dual system efforts are made to collect the plastic waste separately from the common components of the garbage and to recycle them and/or reutilize them. Thus plastic waste substantially contains carbon and hydrogen and has the same heat content as a heavy heating oil. A maximum of 2.5 million tons of plastic waste can be collected per year in Germany.

Narrow limits are however placed on the direct reutilization of these plastic waste materials, since the collected plastic waste materials include a mixture of different compounds, which cannot be separated sufficiently into their individual polymer components. Plastic materials used in individual applications, such as e.g. in the packaging industry, the automobile industry or the construction industry, must have exact and definite properties, which only can be achieved with pure plastics. Furthermore reutilized plastic material cannot therefor fulfill these qualitative requirements, because a qualitative reduction in the properties always accompanies the repetition of an already once completed process step.

It is thus obvious to use the energy content of the plastic waste by combustion to produce heat, as is done in the garbage incineration plant. Opposing this however is the fact that plastic waste material always contains halogen-containing substances, e.g. PVC, which leads to formation of hydrochloric acid and more or less amounts of polycyclic halogen-containing compounds (dioxins and/or furans), which are released to the atmosphere in the exhaust gases. The removal of these harmful substances from the exhaust gases is however only possible with comparatively great expense. The danger exists that if the exhaust gas wash process is interrupted in operation, these harmful substances can be released at least for a limited time to the atmosphere.

SUMMARY OF THE INVENTION

It is an object of the present invention to provide a process for working up municipal plastic waste by gasification which avoids the above-described disadvantages and provides an environmentally friendly utilization of the plastic waste.

According to the invention the process includes the steps of:

a) after being freed from metallic components and purified, compressing and heating a plurality of plastic waste material pieces of about 20 mm piece size in a screw extruder at a pressure of from 40 to 80 bar until at a temperature of from 230° to 300° C. to produce an HCl-containing gas and a heated and compressed plastic waste material containing less than 3000 mg of HCl per kg;

b) washing the HCl-containing gas produced during the compressing and heating step a) in a counterflow with water in an absorber to produce a hydrochloric acid solution;

c) further heating the heated and compressed plastic waste material pieces containing less than 3000 mg of HCl per kg in a heating vessel until at a temperature of from 400° to 500° C. to form a plastic melt having a viscosity of less than 300 cSt, advantageously less than 50 cSt;

d) gasifying the plastic melt formed in step c) in a gasification reactor at a pressure of 4 bar with oxygen in a flame reaction to form a crude gas in a gasification chamber having a central temperature of about 1600° C., a carbon content of the plastic melt being substantially converted to CO in the crude gas;

e) withdrawing the crude gas from the gasification reactor at a temperature of 1300° to 1600° C. and quenching the crude gas from the gasification reactor to directly cool it until at a temperature of 700° to 900° C. by quenching, advantageously by spraying of water and/or feeding another gas into a gas quenching unit to which the crude gas coming directly from the gasification reactor is conducted;

f) after performing step e), further cooling the crude gas by indirect heat transfer in a heat exchanger producing steam until at a temperature of from 220° to 300° C.;

g) dry dedusting the crude gas cooled in step f) until the crude gas has a dust content of less than 20 mg/Nm$^3$ of the crude gas;

h) after the dry dedusting of step g), subsequently performing a water wash of the crude gas to remove gaseous impurities and residual dust from the crude gas; and i) after performing the water wash of step f), desulfurizing the crude gas to form a purified gas.

The method of the invention is based on the knowledge that a reuse of the elementary building blocks of the plastic material, namely carbon and hydrogen, can occur at best by conversion of these building blocks to synthesis gas without the above-described disadvantages. Synthesis gas, whose carbon monoxide and hydrogen content, can be adjusted by suitable gas treatment to fit the application, is necessary to a large extent in the Chemical Industry. Important examples are the Fischer Tropsch Synthesis, the methanol and ammonia synthesis and the preparation of hydrogen for hydrogenation processes.

In preferred embodiments of the invention steam as well as oxygen is fed to the gasification reactor so that a weight ratio of $H_2O/O_2$ fed to the gasification reactor is less than or equal to 0.3.

The absorber is advantageously made from at least one material inert to HCl and selected from the group consisting of graphite and glasses.

The dry dedusting can be advantageously performed with a candle filter and in preferred embodiments the dust content of the crude gas is reduced to less than 3 mg/Nm$^3$.

In preferred embodiments of the invention the water wash of the crude gas formed in the gasification is performed in a Venturi washer with a stripper to clean wash water circulated through it. The desulfurizing is advantageously performed by washing the crude gas with a methyl-diethanolamine solution with subsequent COS hydrolysis. After desulfurizing the crude gas and gas components from the above-mentioned stripper are processed further in a Claus plant to recovery elemental sulfur.

BRIEF DESCRIPTION OF THE DRAWING

The objects, features and advantages of the present invention will now be illustrated in more detail by the following detailed description, reference being made to the accompanying drawing in which:

The sole FIGURE is a schematic diagram of a plant for performing a process for working up municipal plastic waste by gasification.

DESCRIPTION OF THE PREFERRED EMBODIMENT

The plastic waste material to be processed by the method of the invention is substantially packaging plastic which issued in the household and has the following approximate composition:

| | |
|---|---|
| Polyolefins | 60 to 70% |
| Polystyrene | 20 to 25% |
| PET | 5% |
| PVC | 5%. |

Prior to working up or processing according to the invention the plastic waste material is subjected to a magnetic separation to remove metallic components, to a division or comminution into plastic waste material pieces of about 20 mm size and to a washing and subsequent drying. Then the resulting washed and dried plastic waste material pieces which have about a 20 mm piece size are transferred to a collection container 1.

6450 g of plastic waste material per hour is fed from the collection container 1 into a screw extruder 2. The already prewashed and comminuted plastic waste material pieces are compressed, melted and heated until at about 300° C. because of the high shearing action of the extruder. At temperatures above 230° C. hydrogen chloride gas is released from the PVC of the plastic material. The HCl-containing gas released from the compressed and heated gas is conducted into an absorber 3. In the absorber 3, which is made from an HCl-resistant material, e.g. graphite or glass, the HCl-containing gas is washed in counterflow with water to form a 30% hydrochloric acid solution, so that 667 kg/hr 30% hydrochloric acid solution is drawn off over the pipe 4. The process conditions in the screw extruder 2 are thus adjusted so that the plastic waste material is compressed at a pressure of 40 to 80 bar, advantageously 50 bar, and the temperature is maintained between 230° and 300° C. The screw extruder 2 is designed so that the dwell time of the plastic waste material pieces is sufficient at temperatures greater than 230° C. to lower the HCl-content to less than 3000 mg/kg of the plastic waste material. In the present embodiment the HCl content of the plastic waste material of 30 g per kg plastic material can be reduced to 200 mg/kg.

A plastic melt freed of HCl is drawn from the screw extruder 2 and is subjected to an additional heating to reduce its viscosity. The additional heating occurs in a heating vessel 5, in which the melt is heated to a temperature between 400° and 500° C. These temperatures are maintained until the viscosity of the melt is less than 300 cSt, advantageously until less than 50 cSt. Because of this viscosity reduction it is guaranteed that the melt can be fed into the gasification burner in the gasification reactor 6 substantially without problems. The plastic melt is fed to the gasification burner through a pressure resistance valve and evaporates on issuing from the burner at gasification pressure, the plastic melt being injected by means of an oxygen feed. The plastic melt is gasified with oxygen at a pressure of 4 bar in the gasification reactor 6. The gasification occurs at temperatures in the flame of about 2000° C. The central temperature in the gasification chamber amounts to about 1600° C. The oxygen feed is metered so that the carbon contained in the plastic is converted only to carbon monoxide. Higher molecular weight toxic compounds, such as polychlorobenzenes, are reliably destroyed at the reaction temperatures being used. To guarantee a high carbon conversion on gasification, the gasification conditions are adjusted so that a carbon dioxide content of from 1 to 5%, advantageously 2%, by volume is present in the produced crude gas. If necessary besides oxygen stream can also be conducted into the gasification reactor 6 in which the weight ratio of $H_2O/O_2$ is less than or equal to 0.3. The required oxygen is fed over the pipe 7 and the hydrogen is conducted over the pipe 8 into the gasification reactor 6. The gasification reactor 6 can be a reactor of conventional structure, for example of the Koppers-Totzek Reactor variety, which is equipped with two facing or opposing gas burners.

The crude gas produced in the gasification reactor 6 arrives in the gas quenching unit 9 at a temperature of from 1300° to 1600° C. The gas is directly cooled in the gas quenching unit 9 until at a temperature of 700° to 900° C. by spraying water and/or feeding another gas into the gas quenching unit 9. The other gas can be fed into the quenching unit 9 over pipe 10. The gas quenching unit 9 is connected directly to the gasification reactor 6 and can be constructed in a single structural unit with it. In the embodiment of the method described here 16032 m³ n per hour of crude gas flows out of the gas quenching unit 9 and the composition (dry) of the gas immediately downstream of the gas quenching unit 9 was as follows:

| | | |
|---|---|---|
| $CO_2$ | 4.52 | % By Volume |
| CO | 55.94 | % by volume |
| $H_2$ | 39.25 | % by volume |
| $N_2$ | 0.15 | % by volume |
| $H_2S$ | 0.13 | % by volume |
| COS | 0.0082 | % by volume |
| $CH_4$ | 0.0049 | % by volume |

The crude gas temperature is further reduced by indirect cooling with steam production until at a temperature of 220° to 300° C. at the gas quenching unit 9. This cooling can occur for example in a crude gas pipe boiler 11, which is connected with a stream cylinder 12. The steam produced in this way is delivered through the pipe 13, from which the pipe 8 branches to supply steam to the gasification reactor 6. In the present embodiment saturated steam can be drawn off over the pipe 13 with a pressure of 37 bar in an amount of 6787 kg/h.

The cooled crude gas is conducted subsequently through a filtering candle 14 and thus subjected to a dry dedusting until at values of less than 20 mg dust/Nm³ gas, advantageously less than 3 mg dust/Nm³. Subsequent to the dry dedusting a water wash of the gas occurs which can be performed in a Venturi washer 15 and by which the residual HCl and $NH_3$ as well as the residual dust are washed out of the gas. The required wash water is circulated in a known way through a stripper 16 which removes the gaseous components received by the wash water. Sodium hydroxide can be added, as needed, to the wash water circulation for neutralization of the acidic gases present in the wash water. Furthermore gas condensates from the desulfurization can be fed into the wash water circulation of the Venturi washer 15 for adjustment of the water balance. Subsequent to the water wash the gas is fed to a desulfurization unit 17 after separation from water. The desulfurization performed in the desulfurization unit 17 can occur by a known process, for example by washing with a methyldiethanolamine solution (MDEA wash) with subsequent COShydrolysis. After the desulfurization the obtained pure gases are fed for further reuse and/or processing. In the present example thus 17378 Nm³/h pure gas with the following composition:

| | | |
|---|---|---|
| $CO_2$ | 4.29 | % By Volume |
| CO | 51.50 | % by volume |
| $H_2$ | 36.11 | % by volume |
| $N_2$ | 8.09 | % by volume | is delivered over the output pipe 18. In as much as the production of a pure synthesis gas without nitrogen is desired it is necessary to use pure oxygen, i.e. a gas which is greater than 99.8% oxygen, for the gasification and perform the rinsing of the filter candle (cleaning out) with product gas. The hydrogen sulfide washed from the gas in the desulfurization fed to a Claus plant 19 is worked up in a known way to form elemental sulfur. Because of that, 31 kg/h of elementary sulfur is also produced. The gas components driven off in the stripper 16 can be conducted into the Claus plant 19.

Only the plant units which are essential for the method according to the invention have been illustrated in the drawing figure. In practice these essential plant units are equipped with as needed with auxiliary devices. The advantage of the process according of the invention is that the method is performed with process units and components which have already been known for a long time and have been successfully used in comparable application cases. Thus this experience can be drawn on in the building of a large scale plant for performing the process according to the invention which considerably shortens the construction time. The gas produced by the process according to the invention has a synthesis gas purity and can be used wither as a synthesis gas in the chemical industry or for producing energy for the production of current or heat at a remote location. Undesirable environmental emissions of harmful substances do not occur using this gas.

While the invention has been illustrated and described as embodied in a process for working up municipal plastic waste by gasification, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for gasifying municipal plastic waste material comprising the steps of:
   a) compressing and heating a plurality of plastic waste material pieces of about 20 mm piece size in a screw extruder at a pressure of from 40 to 80 bar until at a temperature of from 230° to 300° C. to produce an HCl-containing gas and a heated and compressed plastic waste material containing less than 3000 mg of HCl per kg of said plastic waste materials pieces, said plastic waste material pieces being purified and freed of metallic components prior to said compressing and heating;
   b) washing the HCl-containing gas produced during the compressing and heating step a) in a counterflow with water in an absorber to produce a hydrochloric acid solution;
   c) further heating the heated and compressed plastic waste material containing less than 3000 mg of HCl per kg of said plastic waste materials pieces in a heating vessel until at a temperature of from 400° to 500° C. to form a plastic melt having a viscosity of less than 300 cSt;
   d) gasifying the plastic melt formed in step c) in a gasification reactor at a pressure of 4 bar with oxygen in a flame reaction to form a crude gas in a gasification chamber having a central temperature of about 1600° C., a carbon content of the plastic melt being substantially converted to CO in the crude gas;
   e) withdrawing said crude gas from said gasification reactor at a temperature of from 1300° to 1600° C. and directly cooling until at a temperature of said crude gas is from 700° to 900° C. by quenching;
   f) after performing step e), further cooling said crude gas by indirect heat transfer in a heat exchanger producing steam until at a temperature of from 220° to 300° C.;
   g) dry dedusting the crude gas cooled in step f) until said crude gas has a dust content of less than 20 mg/Nm³ of the crude gas;
   h) after the dry dedusting of step g), subsequently performing a water wash of said crude gas to remove gaseous impurities and residual dust from said crude gas; and
   i) after performing the water wash of step h), desulfurizing the crude gas to form a purified gas.

2. A process as defined in claim 1, wherein said quenching occurs by spraying of water into a gas quenching unit to which said crude gas coming directly from said gasification reactor is conducted.

3. A process as defined in claim 1, wherein said quenching occurs by feeding another gas into a gas quenching unit to which said crude gas coming directly from said gasification reactor is conducted.

4. A process as defined in claim 1, wherein said viscosity of said plastic melt is reduced to less than 50 cSt by said further heating.

5. A process as defined in claim 1, further comprising feeding steam as well as said oxygen to said gasification reactor in a weight ratio of said steam to said oxygen of less than or equal to 0.3.

6. A process as defined in claim 1, wherein said absorber is made from at least one material inert to said HCl and selected from the group consisting of graphite and glasses.

7. A process as defined in claim 1, wherein said dry dedusting is performed with a candle filter and said dust content of said crude gas is reduced to less than 3 mg/Nm³.

8. A process as defined in claim 1, wherein said water wash of said crude gas to remove gaseous impurities and residual dust from said crude gas is performed in a Venturi washer with a wash water and further comprising circulating said wash water from said Venturi washer through a stripper to clean said wash water.

9. A process as defined in claim 1, wherein said desulfurizing is performed by washing said crude gas with a methyl-diethanolamine solution with following COS hydrolysis.

10. A process as defined in claim 1, further comprising, after said desulfurizing, processing said crude gas in a Claus plant to recovery elementary sulfur.

11. A process as defined in claim 8, further comprising generating gas components in said stripper and, after said desulfurizing, processing said crude gas and said gas components from said stripper in a Claus plant to recovery elemental sulfur.

* * * * *